US008757199B2

(12) United States Patent
Chen et al.

(10) Patent No.: US 8,757,199 B2
(45) Date of Patent: Jun. 24, 2014

(54) VIBRATION DAMPENING SPRING CLIP FOR PRESSURE REGULATOR

(75) Inventors: King Chen, Hamgzhou (CN); Scott M. Heaton, Ham Lake, MN (US); Jason D. Clifford, Brooklyn Park, MN (US)

(73) Assignee: Tescom Corporation, Elk River, MN (US)

( * ) Notice: Subject to any disclaimer, the term of this patent is extended or adjusted under 35 U.S.C. 154(b) by 0 days.

(21) Appl. No.: 13/424,974

(22) Filed: Mar. 20, 2012

(65) Prior Publication Data

US 2012/0241025 A1    Sep. 27, 2012

Related U.S. Application Data

(63) Continuation of application No. PCT/CN2011/071998, filed on Mar. 21, 2011.

(30) Foreign Application Priority Data

Mar. 21, 2011    (CN) .......................... 2011 1 0071637

(51) Int. Cl.
*F16K 31/12*    (2006.01)
*G05D 16/02*    (2006.01)

(52) U.S. Cl.
USPC ...................... 137/505; 137/505.42; 251/337

(58) Field of Classification Search
CPC .......... G05D 16/0636; G05D 16/0661; G05D 16/0655; F01L 1/462; F01L 3/10
USPC ........ 251/64, 337; 137/505, 505.42; 267/160, 267/163, 180, 182, 179
See application file for complete search history.

(56) References Cited

U.S. PATENT DOCUMENTS

| | | | | | |
|---|---|---|---|---|---|
| 1,746,220 | A | * | 2/1930 | Manning | ........................ 251/337 |
| 2,049,382 | A | * | 7/1936 | Deming | ................... 137/505.42 |
| 3,149,828 | A | * | 9/1964 | Schutmaat | ..................... 267/175 |
| 3,386,465 | A | * | 6/1968 | Johnson | ........................ 137/463 |
| 3,524,469 | A | | 8/1970 | Jebe | |
| 4,521,005 | A | * | 6/1985 | Calderoni | ...................... 267/179 |
| 4,538,563 | A | * | 9/1985 | Mayers | ...................... 123/90.67 |
| 4,646,700 | A | * | 3/1987 | Tuckey | ......................... 123/510 |
| 5,062,449 | A | | 11/1991 | Woollums et al. | |

(Continued)

OTHER PUBLICATIONS

"Contoured", MacMillan Dictionary, Nov. 5, 2013.*

(Continued)

*Primary Examiner* — Stephen M Hepperle
*Assistant Examiner* — R. K. Arundale
(74) *Attorney, Agent, or Firm* — Marshall, Gerstein & Borun LLP; Michael P. Furmanek

(57) ABSTRACT

A control assembly for a fluid flow control device includes a control element, a load spring, and a spring clip. The control element can be movably disposed for controlling fluid flow, and the load spring biases the control element into a predetermined position. The spring clip contacts the load spring at a plurality of points to dampen vibrations experienced by the load spring, thereby reducing and./or eliminating resonance. The spring clip includes a body plate and first and second opposing arm plates extending away from the body plate. Each arm plate includes a proximal end adjacent the body plate, a distal end spaced away from the body plate, and a finger extending upwardly away from the distal end. A corner at an intersection between the finger and the distal end includes a contoured edge for facilitating attachment of the load spring to the spring clip.

21 Claims, 5 Drawing Sheets

(56) References Cited

U.S. PATENT DOCUMENTS

| | | | |
|---|---|---|---|
| 5,113,831 A | 5/1992 | Grant | |
| 5,131,425 A * | 7/1992 | Sturgis | 137/116.5 |
| 5,735,306 A * | 4/1998 | Olds et al. | 137/116.5 |
| 6,029,694 A * | 2/2000 | Schwegler et al. | 137/510 |
| 6,176,256 B1 | 1/2001 | Nakajima et al. | |
| 6,629,544 B2 * | 10/2003 | Nakajima et al. | 137/505 |
| 6,705,343 B2 * | 3/2004 | Claire et al. | 137/505.41 |
| 2009/0071548 A1 | 3/2009 | Patterson et al. | |

OTHER PUBLICATIONS

International Search Report and Written Opinion for International Application No. PCT/CN2011/071998 dated Jan. 5, 2012.

* cited by examiner

VIBRATION DAMPENING SPRING CLIP FOR PRESSURE REGULATOR

CROSS-REFERENCE

This is a continuation of International Patent Application No. PCT/CN2011/071998, filed Mar. 21, 2011, and claims the benefit of priority of Chinese Patent Application No. 201110071637.6, filed Mar. 21, 2011, the entire contents of each of which is hereby incorporated herein by reference.

FIELD OF THE DISCLOSURE

The present disclosure is directed to a pressure regulator and, more particularly, a pressure regulator including a vibration dampening spring clip.

BACKGROUND

Many conventional regulators include a valve body and a control assembly for regulating fluid flow through the valve body. The control assembly generally comprises a control element such as a valve plug, for example, coupled to a diaphragm or other pressure sensing device for automatically moving the control element in response to pressure changes at the outlet of the valve body. Additionally, some conventional regulators include a spring that biases the control element into a predetermined position in the valve body, e.g., an open position or a closed position. So configured, during operation, the spring naturally biases the control element into its predetermined position and changes in the outlet pressure change the position of the control element to enable or disable fluid flow through the valve body, as desired. Fluid flowing through the valve body can generate vibrations in the system. High and low frequency resonance caused by these vibrations can hamper the operational integrity of the regulators.

One solution for reducing resonance is to include a spring clip surrounding a portion of the load spring to dampen vibrations. One conventional design of a spring clip 1 includes a generally U-shaped member such as that depicted in FIGS. 1 and 2. The spring clip 1 depicted in FIGS. 1 and 2 includes a body plate 2 and a pair of opposing arm plates 3 extending outwardly therefrom. When assembled into the regulator, the spring clip 1 is positioned into a cylindrical cup shaped member 4, as depicted in FIG. 2, and then a bottom portion of a spring 5 is disposed positioned between the opposing arm plates 3 and body plate 2. This assembly process can be tedious and time-consuming as the spring clip must be manually manipulated to spread the arm plates 3 apart.

SUMMARY

One aspect of the present disclosure provides a fluid flow control device including a valve body, a bonnet, a control element, a load spring, and a spring clip. The valve body defines an inlet, an outlet, a throat disposed between the inlet and the outlet, and a flow path extending between the inlet and the outlet. The bonnet is attached to the valve body adjacent to the throat and defining a bonnet cavity. The control element is movably disposed in the throat of the valve body for controlling a flow of fluid along the flow path. The load spring is disposed in the bonnet cavity and biasing the control element into a predetermined position relative to the throat. The spring clip is disposed in the bonnet cavity and attached to the load spring. The spring clip contacts the load spring at a plurality of points to dampen vibrations during operation of the fluid flow control device, and includes a body plate and first and second opposing arm plates extending away from the body plat. Each of the first and second arm plates includes a proximal end adjacent the body plate, a distal end spaced away from the body plate, and a finger extending upwardly away from the distal end such as to define a corner at an intersection between the finger and the distal end, the corner including a contoured edge for facilitating attachment of the load spring to the spring clip.

In some embodiments, the contoured edge is a ramp.

In some embodiments, the contoured edge includes an inwardly curved side profile.

In some embodiments, the contoured edge includes a chamfered side profile.

In some embodiments, the body plate and arm plates are arranged such that the spring clip is U-shaped.

In some embodiments, the arm plates are L-shaped.

In some embodiments, a portion of the load spring is disposed between the opposing arm plates of the spring clip.

In some embodiments, the device further includes a back-up plate disposed between the load spring and the control element, the back-up plate movable with the control element and comprising cavity, in which the spring clip is disposed.

In some embodiments, the device further includes an o-ring disposed between the back-up plate and the bonnet for dampening vibrations experienced by the back-up plate during operation of the device.

In some embodiments, the device further includes a diaphragm fixed between the bonnet and the valve body for imparting motion to the control element in response to pressure changes at the outlet of the valve body.

Another aspect of the present disclosure provides, a control assembly for a fluid flow control device. The assembly includes a control element, a load spring, and a spring clip. The control element is adapted to be movably disposed in a fluid flow control device for controlling fluid flow. The load spring biases the control element into a predetermined position. The spring clip contacts the load spring at a plurality of points to dampen vibrations experienced by the load spring. The spring clip comprises a body plate and first and second opposing arm plates extending away from the body plate. Each of the first and second arm plates includes a proximal end adjacent the body plate, a distal end spaced away from the body plate, and a finger extending upwardly away from the distal end such as to define a corner at an intersection between the finger and the distal end, the corner including a contoured edge for facilitating attachment of the load spring to the spring clip.

In some embodiments, the contoured edge is a ramp.

In some embodiments, the contoured edge includes an inwardly curved side profile.

In some embodiments, the contoured edge includes a chamfered side profile.

In some embodiments, the body plate and arm plates are arranged such that the spring clip is U-shaped.

In some embodiments, the arm plates are L-shaped.

In some embodiments, a portion of the load spring is disposed between the opposing arm plates of the spring clip.

In some embodiments, the assembly further includes a back-up plate disposed between the load spring and the control element, the back-up plate comprising a cavity, in which the spring clip is disposed.

In some embodiments, the assembly further includes an o-ring disposed around an outside of the back-up plate and adapted to dampen vibrations experienced by the back-up plate during operation of the fluid flow control device.

Another aspect of the present disclosure provides a fluid flow control device including a valve body, a bonnet, a control element, a diaphragm, a load spring, a back-up plate, and a spring clip. The valve body defines an inlet, an outlet, a throat disposed between the inlet and the outlet, and a flow path extending between the inlet and the outlet. The bonnet is attached to the valve body adjacent to the throat and defines a bonnet cavity. The control element is movably disposed in the throat of the valve body between an open position and a closed position for controlling a flow of fluid along the flow path. The diaphragm is fixed between the valve body and the bonnet for imparting motion to the control element in response to changes in pressure at the outlet of the valve body. The load spring is disposed in the bonnet cavity and biases the control element toward the open position. The back-up plate is disposed in the bonnet cavity between the load spring and the diaphragm and includes a cavity receiving a portion of the load spring. The spring clip is disposed in the cavity of the back-up plate around a portion of the load spring and contacts the load spring at a plurality of points to dampen vibrations during operation of the fluid flow control device. The spring clip includes a body plate and first and second opposing arm plates extending away from the body plate. Each of the first and second arm plates includes a proximal end adjacent the body plate, a distal end spaced away from the body plate, and a finger extending upwardly away from the distal end such as to define a corner at an intersection between the finger and the distal end, the corner including an inwardly curved profile or a chamfered profile for facilitating attachment of the load spring to the spring clip.

In some embodiments, the device further includes an o-ring disposed between an external sidewall of the cylindrical cup of the back-up plate and the bonnet for dampening vibrations experienced by the back-up plate during operation of the fluid flow control device.

DETAILED DESCRIPTION

The present application is generally directed to a spring clip, as is used in control assemblies of fluid flow control devices (e.g., regulators), for dampening vibrations and reducing and/or eliminating resonance. The spring clip includes a body plate and opposing arm plates that extend away from the body plate. Fingers extend upwardly away from distal ends of the arm plates. To facilitate assembly of the control assembly, interior corners disposed between the fingers and the arm plates include contoured edges. So configured, a terminal end of the load spring can be positioned to engage the contoured edges while a downward force is applied to the load spring. The downward force causes the load spring to slide along the contoured edges and force the opposing arm plates to spread apart such that a bottom portion of the load spring becomes disposed in the spring clip between the opposing arm plates. The natural inward bias of the arm plates helps maintain the spring clip in contact with the load spring at a plurality of points to dampen vibrations and alleviate resonance.

Figure 1:
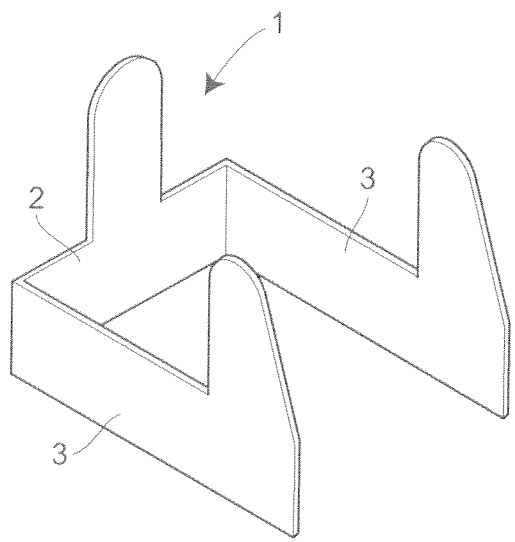
FIG. 1 is a perspective view of a conventional spring clip used in fluid pressure regulators.
Figure 2:
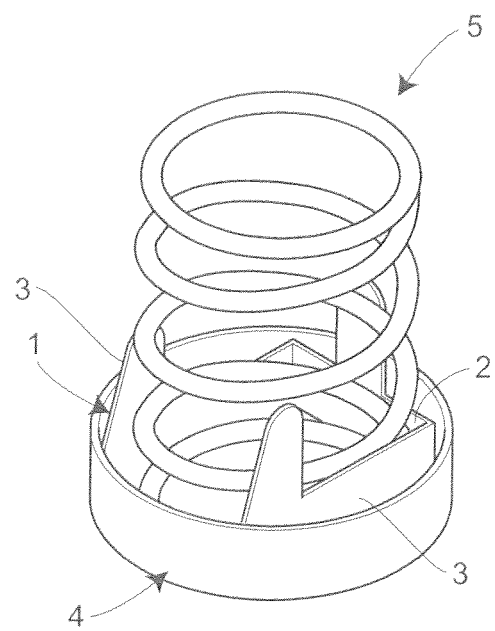
FIG. 2 is a perspective view of the conventional spring clip of FIG. 1 disposed within a back-up plate of a fluid pressure regulator and attached to a load spring.
Figure 3:
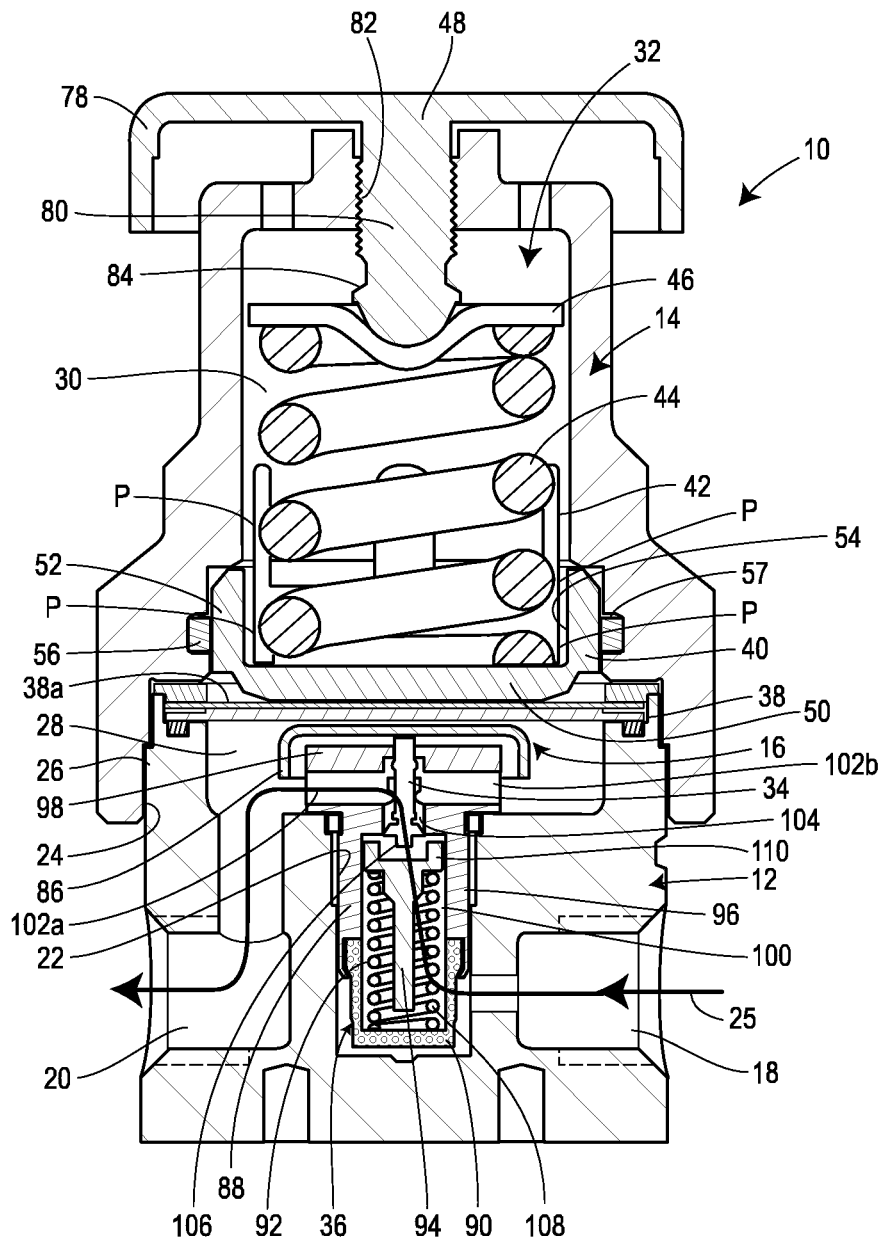
FIG. 3 is a cross-sectional side view of one embodiment of a fluid flow control device constructed in accordance with the teachings of the present disclosure.

With reference now to FIGS. 3 through 7, various embodiments of the present disclosure will now be described. FIG. 3 is a cross-sectional side view of a fluid flow control device 10 constructed in accordance with the teachings of the present disclosure. The fluid flow control device 10 includes a valve body 12, a bonnet 14, and a control assembly 16.

The valve body 12 includes an inlet 18, an outlet 20, a throat 22, an exhaust cavity 28, and a flow path 25. The flow path 25 extends from the inlet 18, through the throat 22 and the exhaust cavity 28, to the outlet 20. The bonnet 14 includes a generally hollow cylindrically shaped member defining a cylindrical bonnet cavity 30. The bonnet 14 is attached to the valve body 12 adjacent to the throat 22 via a plurality of internal threads 24, which are in threaded engagement with a plurality of external threads 26 formed on the valve body 12.

Still referring to FIG. 3, the control assembly 16 of one embodiment of the present disclosure includes a loading subassembly 32, a control element or connector 34, and a valve cartridge subassembly 36. The loading subassembly 32 includes a diaphragm 38, a back-up plate 40, a spring clip 42 (see also FIGS. 4 and 5), a load spring 44, a pressure plate 46, and an adjustment knob 48. The diaphragm 38 includes a flexible sheet of material having its periphery compressed between the bonnet 14 and the valve body 12 adjacent to the exhaust cavity 28. So configured, the diaphragm 38 seals the exhaust cavity 28 from the bonnet cavity 30. As depicted in FIGS. 3 and 5, the back-up plate 40 includes a cylindrical cup shaped member disposed on a top surface 38a of the diaphragm 38. More specifically, the back-up plate 40 includes a bottom wall 50 and a hollow cylindrical sidewall 52 extending upwardly away from the bottom wall 50, relative to the orientation of the device 10 depicted in FIG. 3. Said another way, the cylindrical sidewall 52 extends from the bottom wall 50 in a direction away from the diaphragm 38. So configured, the back-up plate 40 defines an internal cylindrical cavity 54. As shown in FIG. 3, an o-ring 56 is disposed around an external surface of the cylindrical sidewall 52 of the back-up plate 40. In the depicted embodiment, the o-ring 56 is disposed within an annular recess 57 formed in an inside sidewall of the bonnet 14. So configured, the o-ring 56 is disposed between the back-up plate 40 and the bonnet 14.

Figure 8:
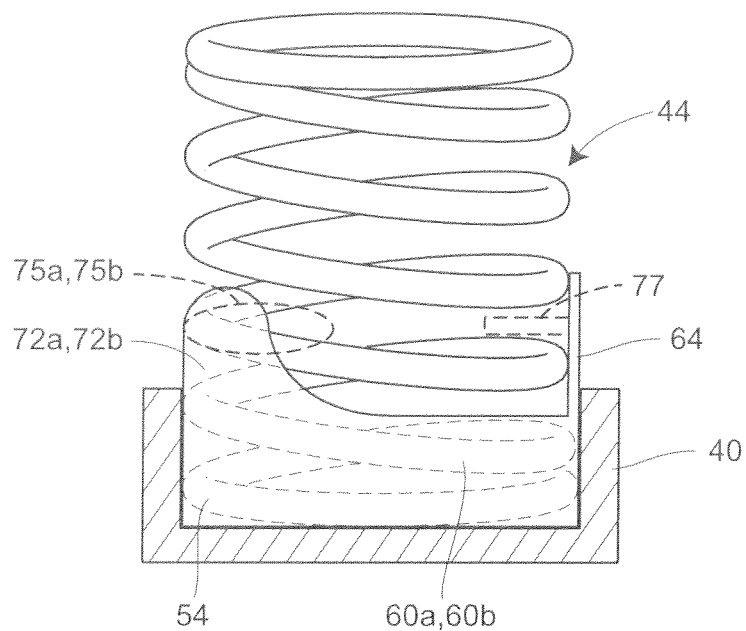
FIG. 8 is a partial cross-sectional side view of the assembly of FIG. 5 showing the load assembled into the spring clip.

Still referring to FIGS. 3 and 5, when assembled, the spring clip 42 is disposed in the cavity 54 of the back-up plate 40. Moreover, as depicted in FIGS. 3 and 8, a lower portion of the load spring 44 is also disposed inside the cavity 54 of the back-up plate 40, and also inside of the spring clip 42. So configured, the spring clip 42 contacts the load spring 44 at least at a plurality of points P (shown in FIG. 3) around its outer peripheral surface. The illustrated points P of contact are merely examples and other contacts points may exist. So configured, the spring clip 42 can dampen vibrations experienced by the load spring 44 during use of the fluid flow control device 10. Still referring to FIG. 3, the disclosed embodiment of the load spring 44 includes a coil spring disposed in the bonnet cavity 30 and the pressure plate 46 of the loading subassembly 32 is disposed on top of the load spring 44. The load spring 44 biases the back-up plate 40 and diaphragm 38 in a downward direction relative to the orientation of the fluid flow control device depicted in FIG. 3, i.e., away from the pressure plate 46. Moreover, the magnitude of the force generated by the load spring 44 is adjustable through the adjustment knob 48. In the present embodiment, the adjustment knob 48 includes a cap portion 78 and a stem portion 80. The stem portion 80 includes an elongated threaded shaft in threaded engagement with a threaded aperture 82 formed in the bonnet 14. A tip 84 of the stem portion 80 axially engages the pressure plate 46, as shown. The cap portion 78 of the adjustment knob 48 is disposed outside of the bonnet and includes a generally circular cylinder sufficiently sized for grasping by a user. So configured, rotation of the cap portion 78 in a clockwise direction relative to the bonnet 14 causes the stem portion 80 to displace into the bonnet cavity 30 and further compress the load spring 44, thereby compressing the load spring 44 and increasing the magnitude of the force that the load spring 44 applies to the back-up plate 40 and diaphragm 38. In contrast, rotating the cap portion 78 in a counter clockwise direction relative to the bonnet 14 causes the stem portion 80 to withdraw from the bonnet cavity 3, thereby allowing the load spring 44 to expand which reduces the magnitude of the force that the load spring 44 applies to the back-up plate 40 and diaphragm 38.

Figure 4:
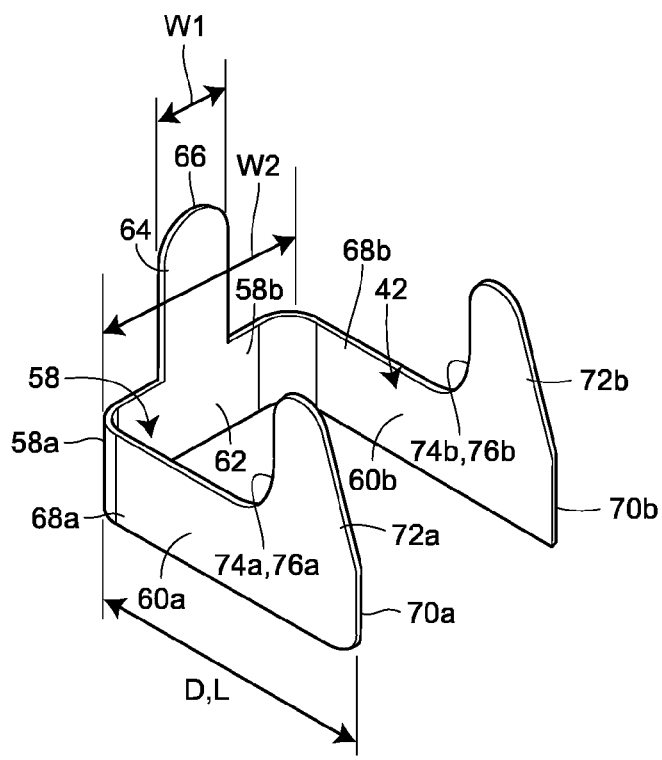
FIG. 4 is a perspective view of one embodiment of a spring clip constructed in accordance with the teachings of the present disclosure.
Figure 5:
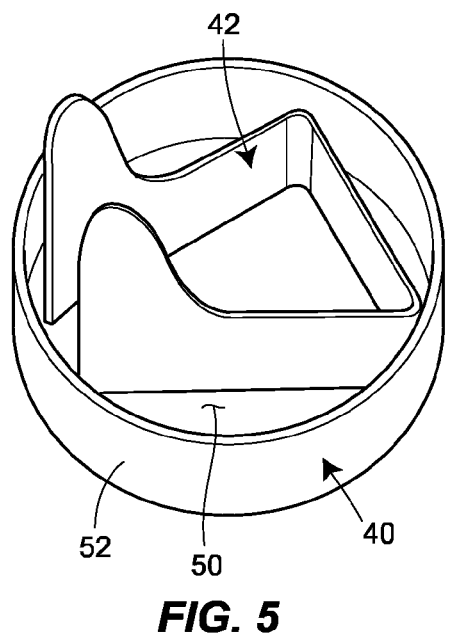
FIG. 5 is a perspective view of the spring clip of FIG. 4 disposed within a back-up plate of the fluid flow control device of FIG. 3.

As depicted in FIGS. 4 and 5, the spring clip 42 includes a generally flat piece of material occupying a generally U-shaped configuration, as shown. The spring clip 42 can be made from a plastic material, a metal material, or generally any suitable material. In one embodiment, the spring clip 42 can be constructed from 1302 or 316 SST spring material that is 0.008 inches think. In the disclosed embodiment, the spring clip 42 includes a body plate 58 and first and second opposing arm plates 60a, 60b extending outward from opposite ends 58a, 58b, respectively, of the body plate 58. In the disclosed embodiment, the ends 58a, 58b of the body plate 58 are curved to define rounded corners transitioning into the arm plates 60a, 60b. The body plate 58 includes a rectangular base portion 62 and a tongue portion 64 extending upwardly from the base portion 62. The tongue portion 64 is also generally rectangular, but has a width dimension W1 that is smaller than a width dimension W2 of the base portion 62 such that the tongue portion 64 resembles a narrow tab extending upward from a top edge of the base portion 62. In the disclosed embodiment, the tongue portion 64 further includes a distal end 66 with a rounded edge.

The arm plates 60a, 60b of the disclosed embodiment of the spring clip 42 include proximal ends 68a, 68b, distal ends 70a, 70b, and fingers 72a, 72b. The proximal ends 68a, 68b of the arm plates 60a, 60b are disposed adjacent to the base portion 62 of the body plate 58. More particularly, the proximal ends 68a, 68b of the arm plates 60a, 60b are connected to the opposite ends 58a, 58b, respectively, of the base portion 62 of the body plate 58. In contrast, the distal ends 70a, 70b are spaced away from the body plate 58, as shown, by a distance D that is equal to a length L of the arm plates 60a, 60b.

Figure 6:
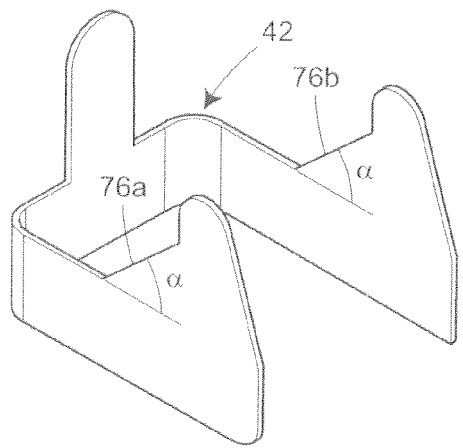
FIG. 6 is a perspective view of an alternative embodiment of a spring clip constructed in accordance with the teachings of the present disclosure.

The fingers 72a, 72b extend upwardly away from the distal ends 70a, 70b of the arm plates 60a, 60b such as to define corners 74a, 74b between the arm plates 60a, 60b and the fingers 72a, 72b. So configured, the arm plates 60a, 60b can be described as being generally L-shaped. In the disclosed embodiment, the corners 74a, 74b include contoured edges 76a, 76b for facilitating assembly, as will be described. In the depicted embodiment, the contoured edges 76a, 76b at the corners 74a, 74b between the arm plates 60a, 60b and associated the fingers 72a, 72b include inwardly curved side profiles. A radius of the curved side profiles of the present embodiment is in a range of approximately 5 mm to approximately 20 mm, and in one embodiment, is approximately 8 mm. The term "approximately" is used herein to mean that other radiuses that achieve the same purpose and, which fall within standard manufacturing tolerances, are included in the scope of the present disclosure. In alternative embodiments, the contoured edges 76a, 76b can have other side profiles. For example, in one alternative embodiment, the contoured edges 76a, 76b of the corners 74a, 74b can include angled side profiles such as that depicted in FIG. 6. These angled side profiles can be referred to as chamfered edges, for example. In FIG. 6, the contoured edges 76a, 76b can be disposed at an angle a relative to the arm plates 60a, 60b in a range of approximately 15° to approximately 85° and, in one embodiment, can be approximately 45°. The term "approximately" is used herein to mean that other angles that achieve the same purpose and, which fall within standard manufacturing tolerances, are included within the scope of the present disclosure. Angles not expressly disclosed herein are not directly excluded from the scope of the present disclosure. Accordingly, it should be appreciated that as used herein, a "contoured" edge is not limited to the rounded or angled side profiles expressly disclosed, but rather, may include other side profiles capable of serving the intended purpose of the present disclosure.

Referring back to FIG. 3, the valve cartridge subassembly 36 of the disclosed embodiment of the fluid flow control device 10 includes a number of components supporting the control element 34 in a linearly slidable manner. More specifically, the valve cartridge subassembly 36 includes a valve cap 86, a cartridge body 88, a filter 90, a control spring 92, and a piston 94. The cartridge body 88 includes a generally cylindrical body including a loading portion 96 and an exhaust portion 98. The loading portion 96 is disposed within the throat 22 of the valve body 12 and defines a loading cavity 100. The exhaust portion 98 is disposed in the exhaust cavity 28 of the valve body 12 and defines at least a pair of through-bores 102a, 102b in communication with the exhaust cavity 28 of the valve body 12. The cartridge body 88 further defines an aperture 104 extending between the loading cavity 100 and the through-bores 102a, 102b. As shown, the control element 34 is slidably disposed within the aperture 104 and defines a seat 106 that is adapted to engage a lower rim of the aperture 104 to close the flow path 25, as will be described.

Still referring to FIG. 3, the filter 90 of the valve cartridge subassembly 36 includes a cup-shaped member affixed to a bottom portion of the cartridge body 88. The filter 90 therefore defines a generally cylindrical filter cavity 108 in communication with the loading cavity 100 of the cartridge body 88. The filter 90 can be constructed of any porous filter media capable of allowing fluid to flow therethrough, while simultaneously capturing impurities and/or foreign bodies carried by the fluid. The control spring 92 of the valve cartridge subassembly 36 is supported in the filter cavity 108 and extends upwardly into the loading cavity 100 of the cartridge body 88. The piston 94 of the valve cartridge subassembly 36 is disposed through the control spring 92 and includes an upper flange portion 110 with a diameter larger than a diameter of the control spring 92. So configured, the upper flange portion 110 of the piston 94 sits on top of the control spring 92 and also includes a recessed portion receiving a bottom portion of the control element 34, as shown in FIG. 3. So configured, the control spring 92 biases the piston 92 and the control element 34 in an upward direction relative to the orientation of the fluid flow control device 10 depicted in FIG. 3, i.e., toward the diaphragm 38 and loading subassembly 32. To facilitate interaction between the loading subassembly 32, the control element 34, and the valve cartridge subassembly 36, the valve cartridge subassembly 36 further includes the valve cap 86, as mentioned above.

The valve cap 86 includes a generally cup-shaped member disposed between the control element 34 and the diaphragm 38. The valve cap 86 helps uniformly transfer motion of the diaphragm 38 into linear motion of the control element 34. For example, during operation, and in the absence of pressure in the exhaust cavity 28 of the valve body 12, the load spring 44 applies a downward force to the back-up plate 40, the diaphragm 38, valve cap 86, and control element 34 to move the back-up plate 40, diaphragm 38, valve cap 86, and control element 34 downward relative to the cartridge body 88. This causes the control element 34 and piston 94 to displace downward into the loading cavity 100 and filter cavity 108 of the valve cartridge subassembly 36 against the bias of the control spring 92, thereby moving the seat 106 on the control element 34 into an open position out of engagement with the lower rim of the aperture 104 of the cartridge body 88. In this situation, the fluid flow control device 10 is considered "open" and fluid is free to flow from the inlet 18 to the outlet 20 along the flow path 25. The device 10 will remain "open" until the pressure in the exhaust cavity 228 increases to the extent that it forces the diaphragm 38 away from the valve cap 86 and control element 34 against the bias of the load spring 44, which then allows the control spring 92 to automatically move the control element 34 upward until the seat 106 engages the lower rim of the aperture 104 in the cartridge body 88, which closes the flow path 25.

As mentioned above, the spring clip 42 of the present disclosure is designed to facilitate assembly of the control assembly 16. For example, as mentioned above and depicted in FIG. 3, when assembled, the bottom portion of the load spring 44 is disposed in the spring clip 42, which is in turn disposed in the cavity 54 of the back-up plate 40. With conventionally designed spring clips, the assembly of these components can be tedious and time-consuming. To help alleviate these concerns, the corners 74a, 74b disposed between the fingers 72a, 72b and the arm plates 60a, 60b of the presently disclosed spring clip 42 include contoured edges 76a, 76b.

Figure 7:
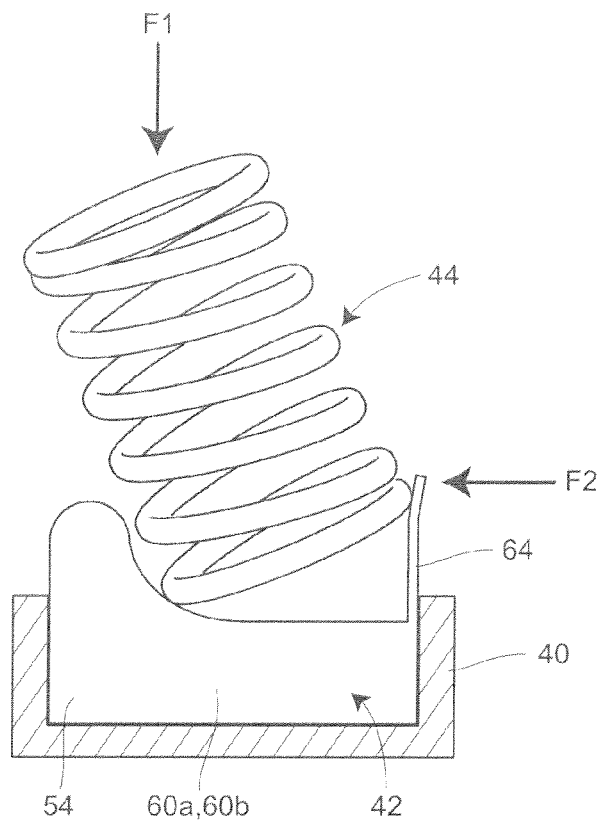
FIG. 7 is a partial cross-sectional side view of the assembly of FIG. 5 showing a load spring at an initial state of assembly.

As such, the spring clip 42 is first positioned into the cavity 54 of the back-up plate 40, as depicted in FIG. 5. Then, as shown in FIG. 7, the bottom portion of the load spring 44 can be positioned on the contoured edges 76a, 76b while a downward force F1 is applied to the load spring 44. The downward force F1 causes the load spring 44 to slide along the contoured edges 76a, 76b and simultaneously force the opposing arm plates 60a, 60b to spread apart. So configured, it can be said that the contoured edges 76a, 76b include ramps that facilitate assembly of the load spring 44 and spring clip 42. Moreover, the bottom portion of the load spring 44 also slidingly engages an inner surface of the tongue portion 64, which urges the tongue 64 away from the fingers 72a, 72b, as shown in FIG. 7. A counter force F2 applied to the load spring 44 by the tongue portion 64 helps urge the bottom portion of the load spring 44 into the cavity 54 of the back-up plate 40 between the opposing arm plates 60a, 60b of the spring clip 62. Once positioned, the natural inward bias of the arm plates 60a, 60b helps to maintain the spring clip 42 in contact with the side surfaces of the load spring 44. This same assembly process can be performed with the alternative spring clip 42 described above with respect to FIG. 6. Once the spring clip 42 is loaded into the cavity 54 of the back-up plate 40, and the load spring 44 is loaded into the spring clip 42, as described, the pressure plate 46 can be position on the load spring 44 opposite the back-up plate 40 and these components can be loaded into the bonnet 14. Thereafter, the bonnet 14 can be threaded onto the valve body 12, with the diaphragm 38 and valve cartridge subassembly 36 in position as depicted in FIG. 3.

In some embodiments, once the load spring 44 is positioned into the spring clip 42, as depicted in FIG. 8, for example, upper tips 75a, 75b of the fingers 72a, 72b of the arm plates 60a, 60b and an upper tip 77 of the tongue 64 can be bent inward over an adjoining coil of the load spring 44, as shown with hidden lines in FIG. 8, for example, to help retain the connection between the load spring 44 and the spring clip 42.

Based on the foregoing, it should be appreciated that the present disclosure provides an improved fluid flow control device 10, an improved control assembly 16, and an improved spring clip 42 that facilitates assembly and reduces high frequency resonance during operation. Moreover, to complement the spring clip 42, the fluid flow control device 10 of the present disclosure also includes the o-ring 56 disposed between the back-up plate 40 and the bonnet 14 such that when the back-up plate 40 moves in response to movement of the diaphragm 38, the o-ring 56 acts to dampen vibrations and further reduce resonance. In some embodiments, the spring clip 42 serves to reduce and/or eliminate high frequency resonance and the o-ring 56 serves to reduce and/or eliminate low frequency resonance.

While the spring clip 42 of the present disclosure has been disclosed as being positioned outside of, and surrounding, the bottom portion of the load spring 44, in alternative embodiments, the spring clip 42 may be designed to be positioned inside of the bottom portion of the load spring 44. Moreover, the spring clip 42 need not be position at the bottom portion of the load spring 44, but rather, could be positioned at an upper portion of the load spring 44, for example.

While the load spring 44 has been described as a simple coil spring, the load spring 44 could also be coated with a plastic or rubber material, for example, to further assist with the reduction and/or elimination of resonance.

The foregoing written description provides examples of structure and function representative of the present invention, but not intended to limit the scope beyond that which is recited in the appending claims.

What is claimed:

1. A fluid flow control device comprising:
   a valve body defining an inlet, an outlet, a throat disposed between the inlet and the outlet, and a flow path extending between the inlet and the outlet;
   a bonnet attached to the valve body adjacent to the throat and defining a bonnet cavity;
   a control element movably disposed in the throat of the valve body for controlling a flow of fluid along the flow path;
   a load spring disposed in the bonnet cavity and biasing the control element into a predetermined position relative to the throat; and
   a spring clip disposed in the bonnet cavity and attached to the load spring, the spring clip contacting an outer peripheral surface of the load spring at a plurality of points to dampen vibrations during operation of the fluid flow control device, the spring clip comprising a body plate and first and second opposing arm plates extending away from the body plate,
   each of the first and second arm plates including a proximal end adjacent the body plate, a distal end spaced away from the body plate, and a finger extending upwardly away from the distal end such as to define a corner at an intersection between the finger and the distal end, the corner including a contoured edge for facilitating attachment of the load spring to the spring clip, wherein the first and second arm plates are biased together into contact with the outer peripheral surface of the load spring, wherein the body plate and the first and second arm plates are arranged such that the spring clip is U-shaped when viewed along a longitudinal axis of the load spring, and wherein the first and second arm plates extend transverse to the longitudinal axis of the load spring, and wherein the contoured edge of the corner comprises:
(a) an inwardly curved side profile having a radius in a range of approximately 5 mm to approximately 20 mm; or
(b) a chamfered side profile disposed at an angle in the range of 15° to 85° relative to a corresponding one of the first and second arm plates.

2. The device of claim 1, wherein the contoured edge is a ramp.

3. The device of claim 1, wherein the arm plates are L-shaped.

4. The device of claim 1, wherein a portion of the load spring is disposed between the opposing arm plates of the spring clip.

5. The device of claim 1, further comprising a back-up plate disposed between the load spring and the control element, the back-up plate movable with the control element and comprising a cavity, in which the spring clip is disposed.

6. The device of claim 5, further comprising an o-ring disposed between the back-up plate and the bonnet for dampening vibrations experienced by the back-up plate during operation of the device.

7. The device of claim 1, further comprising a diaphragm fixed between the bonnet and the valve body for imparting motion to the control element in response to pressure changes at the outlet of the valve body.

8. The device of claim 1, wherein the inwardly curved side profile has a radius of approximately 8 mm.

9. The device of claim 1, wherein the chamfered side profile is disposed at an angle in the range of 45° relative to a corresponding one of the first and second arm plates.

10. A control assembly for a fluid flow control device, the assembly comprising:
a control element adapted to be movably disposed in a fluid flow control device for controlling fluid flow;
a load spring biasing the control element into a predetermined position; and
a spring clip contacting an outer peripheral surface of the load spring at a plurality of points to dampen vibrations experienced by the load spring, the spring clip comprising a body plate and first and second opposing arm plates extending away from the body plate,
each of the first and second arm plates including a proximal end adjacent the body plate, a distal end spaced away from the body plate, and a finger extending upwardly away from the distal end such as to define a corner at an intersection between the finger and the distal end, the corner including a contoured edge for facilitating attachment of the load spring to the spring clip, wherein the first and second arm plates are biased together into contact with the outer peripheral surface of the load spring, wherein the body plate and the first and second arm plates are arranged such that the spring clip is U-shaped when viewed along a longitudinal axis of the load spring, and wherein the first and second arm plates extend transverse to the longitudinal axis of the load spring, and wherein the contoured edge of the corner comprises:
(a) an inwardly curved side profile having a radius in a range of approximately 5 mm to approximately 20 mm; or
(b) a chamfered side profile disposed at an angle in the range of 15° to 85° relative to a corresponding one of the first and second arm plates.

11. The assembly of claim 10, wherein the contoured edge is a ramp.

12. The assembly of claim 10, wherein the arm plates are L-shaped.

13. The assembly of claim 10, wherein a portion of the load spring is disposed between the opposing arm plates of the spring clip.

14. The assembly of claim 10, further comprising a back-up plate disposed between the load spring and the control element, the back-up plate comprising a cavity, in which the spring clip is disposed.

15. The assembly of claim 14, further comprising an o-ring disposed around an outside of the back-up plate and adapted to dampen vibrations experienced by the back-up plate during operation of the fluid flow control device.

16. The assembly of claim 10, wherein the inwardly curved side profile has a radius of approximately 8 mm.

17. The assembly of claim 10, wherein the chamfered side profile is disposed at an angle in the range of 45° relative to a corresponding one of the first and second arm plates.

18. A fluid flow control device comprising:
a valve body defining an inlet, an outlet, a throat disposed between the inlet and the outlet, and a flow path extending between the inlet and the outlet;
a bonnet attached to the valve body adjacent to the throat and defining a bonnet cavity;
a control element movably disposed in the throat of the valve body between an open position and a closed position for controlling a flow of fluid along the flow path;
a diaphragm fixed between the valve body and the bonnet for imparting motion to the control element in response to changes in pressure at the outlet of the valve body;
a load spring disposed in the bonnet cavity and biasing the control element toward the open position;
a back-up plate disposed in the bonnet cavity between the load spring and the diaphragm, the back-up plate including a cavity receiving a portion of the load spring; and
a spring clip disposed in the cavity of the back-up plate around a portion of the load spring and contacting an outer peripheral surface of the load spring at a plurality of points to dampen vibrations during operation of the fluid flow control device, the spring clip comprising a body plate and first and second opposing arm plates extending away from the body plate,
each of the first and second arm plates including a proximal end adjacent the body plate, a distal end spaced away from the body plate, and a finger extending upwardly away from the distal end such as to define a corner at an intersection between the finger and the distal end, the corner including an inwardly curved profile or a chamfered profile for facilitating attachment of the load spring to the spring clip, wherein the first and second arm plates are biased together into contact with the outer peripheral surface of the load spring, wherein the body plate and the first and second arm plates are arranged such that the spring clip is U-shaped when viewed along a longitudinal axis of the load spring, and wherein the first and second arm plates extend transverse to the longitudinal axis of the load spring, and wherein the contoured edge of the corner comprises:
(a) an inwardly curved side profile having a radius in a range of approximately 5 mm to approximately 20 mm; or
(b) a chamfered side profile disposed at an angle in the range of 15° to 85° relative to a corresponding one of the first and second arm plates.

19. The device of claim 18, further comprising an o-ring disposed between an external sidewall of the back-up plate and the bonnet for dampening vibrations experienced by the back-up plate during operation of the fluid flow control device.

20. The device of claim 18, wherein the inwardly curved side profile has a radius of approximately 8 mm.

21. The device of claim 18, wherein the chamfered side profile is disposed at an angle in the range of 45° relative to a corresponding one of the first and second arm plates.

\* \* \* \* \*

UNITED STATES PATENT AND TRADEMARK OFFICE
CERTIFICATE OF CORRECTION

PATENT NO.         : 8,757,199 B2
APPLICATION NO.    : 13/424974
DATED              : June 24, 2014
INVENTOR(S)        : King Chen et al.

Page 1 of 1

It is certified that error appears in the above-identified patent and that said Letters Patent is hereby corrected as shown below:

On the Title Page:

Item (75), line 1, "Hamgzhou" should be -- Hangzhou --.

Item (57), line 7, "and./or" should be -- and/or --.

In the Specification:

At Column 5, line 24, "bonnet cavity 3," should be -- bonnet cavity 30, --.

Signed and Sealed this
Third Day of November, 2015

Michelle K. Lee
*Director of the United States Patent and Trademark Office*